United States Patent
Göppner et al.

(10) Patent No.: US 8,767,705 B2
(45) Date of Patent: Jul. 1, 2014

(54) METHOD FOR SYNCHRONIZATION AND DATA TRANSMISSION IN A MULTI-HOP NETWORK

(75) Inventors: Matthias Göppner, Kulmbach (DE); Jurgen Hupp, Nuremberg (DE); Volker Gehrmann, Erlangen (DE); Christian Flugel, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 1272 days.

(21) Appl. No.: 11/791,546

(22) PCT Filed: Nov. 22, 2005

(86) PCT No.: PCT/DE2005/002089
§ 371 (c)(1),
(2), (4) Date: Mar. 7, 2008

(87) PCT Pub. No.: WO2006/056174
PCT Pub. Date: Jun. 1, 2006

(65) Prior Publication Data
US 2008/0165761 A1 Jul. 10, 2008

(30) Foreign Application Priority Data
Nov. 25, 2004 (DE) .......................... 10 2004 057 080

(51) Int. Cl.
*H04J 3/06* (2006.01)
*H04W 56/00* (2009.01)
(52) U.S. Cl.
CPC .................................. *H04W 56/001* (2013.01)
USPC ........................................... 370/350; 370/503
(58) Field of Classification Search
None
See application file for complete search history.

(56) References Cited

U.S. PATENT DOCUMENTS

| 6,466,608 | B1 * | 10/2002 | Hong et al. .................... 375/137 |
| 6,735,448 | B1 | 5/2004 | Krishnamurthy et al. |
| 6,751,248 | B1 | 6/2004 | Tan |
| 6,791,997 | B2 * | 9/2004 | Beyer et al. .................... 370/447 |
| 7,031,329 | B2 * | 4/2006 | Lipsanen ....................... 370/408 |
| 7,072,432 | B2 * | 7/2006 | Belcea .......................... 375/356 |
| 7,180,915 | B2 * | 2/2007 | Beyer et al. .................... 370/516 |
| 7,304,981 | B2 * | 12/2007 | Yoon et al. ..................... 370/350 |

(Continued)

OTHER PUBLICATIONS

International Search Report dated Mar. 22, 2006 issued in PCT/DE2005/002089.

*Primary Examiner* — Rhonda Murphy
(74) *Attorney, Agent, or Firm* — Venable LLP; Robert Kinberg

(57) ABSTRACT

A method for synchronization and communication in a multi-hop network includes: transmitting a synchronization signal by a central node or a previously synchronized node, with a beacon slot assigned a beacon and the hop count value of the transmitting node transmitted in the frame of the synchronization signal, and, for all previously synchronized neighbor nodes of the transmitting node transmitting respective beacon slots and the hop count values in the frame of the synchronization; receiving by a first node the synchronization signal and the data transmitted in connection therewith; synchronizing the first node to the synchronization signal; detecting by the first node its neighbors and their respective beacon slot assignment and hop count values; determining the predecessor of the first node in the network by the first node in dependence of given criteria; storing by the first node the data received with the synchronization signal and data received in connection therewith and determined therefrom; and repetition the foregoing steps until synchronization of all the nodes.

24 Claims, 8 Drawing Sheets

(56) References Cited

U.S. PATENT DOCUMENTS 7,349,339 B2 * 3/2008 Meckelburg et al. ......... 370/235
2003/0151513 A1 8/2003 Herrmann et al.
2005/0089001 A1 * 4/2005 Nishikawa .................... 370/338

* cited by examiner

METHOD FOR SYNCHRONIZATION AND DATA TRANSMISSION IN A MULTI-HOP NETWORK

BACKGROUND OF THE INVENTION

The present invention relates to a method for setting up a synchronized network for wireless communication between transmitter/receiver units, so-called nodes and a central transmitter/receiver unit, the so-called central node, in a multi-hop network. Multi-hop networks find use in a variety of ways in communication technology, for example in monitoring infrastructural elements or the environment.

PRIOR ART

Basically a multi-hop network comprises a multiplicity of network nodes, each having at least one transmitting/receiving means and one processor unit. In multi-hop networks, data are usually transmitted from a first network node, the data source, via a number of other network nodes, which serve as relay stations, so-called intermediate nodes, to a second network node, the data sink. The first node as well as the second node can basically be selected randomly, permitting in this manner, data exchange between network nodes in a multi-hop network without their transmission and reception ranges overlapping, i.e. they are unable to communicate data directly with each other. Any network node can be a data source, data sink or even a relay station. However, the single nodes have to be positioned in relation to each other in such a manner that at least one other network node is located in its transmitting/receiving range in such a way that an interlinked communication structure can be created.

Data exchange in a multi-hop network usually occurs by means of two-directional wireless communication, in particular by means of radio communication. For some applications, one or a multiplicity of network nodes can be distinguished from the other network nodes by their additional to-be-fulfilled functions. For example, if one network node serves as the central data sink in the multi-hop network, this function distinguishes it from other network nodes and it is referred to hereinafter as the central node. The central node can, of course, be assigned another function and/or further additional functions.

A drawback of this present state-of-the-art method for synchronization and communication of multi-hop networks is the considerable amount of computation required in the individual network nodes for setting up, maintaining, continuously optimizing the network as well as for data communication within the network and, in particular, the ensuing high power consumption of the individual network nodes.

In many applications, a battery supplies the power for the individual network nodes. In order to operate the individual network nodes as long as possible with the battery, power consumption for operation must, therefore, be kept as low as possible. Central nodes which transmit many data packets must also have a certain lifetime. A short duty cycle is, therefore, required. The duty cycle is the ratio of a node's active time, i.e. active communication, to its sleep time, i.e. not active communication. Another drawback is that in the corresponding present state-of-the-art methods, due to collisions in radio communication, the as such known so-called "hidden node" problem may occur, rendering the "hidden node", i.e. the corresponding node, inaccessible from the network.

The object of the present invention is to provide a method for collision-free synchronization and communication in a multi-hop network distinguished by low power consumption and a short duty cycle. The method should avoid at least to a large degree the described problems of the previous methods. In particular, it should be possible to create redundant communication paths in order to raise fail-safety. Furthermore, the "hidden node" problem should be avoided.

DESCRIPTION OF THE INVENTION

The object of the present invention is solved with the method according to claim 1. Advantageous embodiments of the method are the subject matter of the subordinate claims or can be drawn from the following description and the preferred embodiments.

The invented method is distinguished by the following process steps:
a) Transmission of a synchronization signal by the central node or a previously synchronized node, with a slot in the frame of the synchronization signal, the so-called beacon slot, determined by the node transmitting the synchronization signal being assigned a data packet, the so-called beacon, and at least the hop count value of the transmitting node being transmitted in the frame of the synchronization signal, and, for all the previously synchronized neighbor nodes of the transmitting node, which are known to the transmitting node, transmission by the transmitting node of the respective beacon slots and the hop count values in the frame of the synchronization signal or as a separate data signal,
b) Reception of the synchronization signal and the data transmitted in connection therewith by a first node lying in the transmitting/receiving range of the transmitting node,
c) Synchronization of the first node to the synchronization signal,
d) Detection by the first node of its neighbors and their respective beacon assignment and hop count values,
e) Determination by the first node of the predecessor of the first node in the network on the basis of given criteria,
f) Storage by the first node of the data received with the synchronization signal as well as data received in connection therewith and determined therefrom,
g) Repetition of steps a) to f) at least until synchronization of all the nodes has occurred.

The invented method for synchronization and communication is based on a multi-hop network having a central node and a multiplicity of nodes. There is no limitation to the size of the network, i.e. the network can comprise as many nodes as desired. Moreover, the method serves to retain the synchronization in normal operation of the network.

The central node and the nodes each have a transmitting/receiving unit, a storage unit and a processor unit. The individual nodes may be stationary or mobile. The power for the nodes and the central node is supplied by rechargeable batteries, the electric network or is generated in situ, for example by solar cells. The central node and the nodes are spatially positioned in relation to each other in such a manner that at least one other node or the central node is located in the transmitting/receiving range of each node. Thus each node is in direct communication connection with at least one other node or with the central node. Communication between a node located outside the transmitting/receiving range of the central node and the central node occurs via multi-hop communication utilizing the other nodes as relay stations (so-called intermediate nodes). In this manner the nodes with no direct communication connection to the central node transmit their data to the central node via the intermediate nodes.

The central node is distinguished from the other nodes of the network by serving as the reference point for the communication paths in the network and, in addition, as a time base for synchronization of the network nodes and thus of the entire network. Following successful synchronization of the network, all the nodes derive, therefore, their time base from the central node. The central node can, of course, assume further functions in the network. For example, it can serve as the central data sink or it can assume network control functions. Due to the central node's additional functions, the hardware equipment of the central node may vary, for example the memory may be larger or computation performance may be greater.

The following terms will apply in the further preferred embodiments:

All the nodes lying within the transmitting/receiving range of a node are referred to as its neighbors.

The number of intermediate nodes raised by one required for communication between a node and the central node is referred to as the so-called hop count value of the node.

All the nodes with the same hop count value form a so-called layer.

In a given communication chain with a multiplicity of nodes, an intermediate node with a hop count value i is taken. The intermediate node of the communication chain with the hop count of i−1 is referred to as the predecessor of the intermediate node with the hop count value i, the one with a hop count value i+1 is referred to as its successor.

The central node and the other nodes of the network form in their entirety the nodes. If in the following description the difference between the central node and the other nodes is decisive, the term "central node" will be explicitly mentioned, if the entirety of all nodes, i.e. including the central node, is meant, the general term "node" will be used.

FIG. 1 show the applied terms using the example of a multi-hop network comprising a central node K1 and the nodes K2-K9. The singly distributed nodes are depicted by ellipses. The arrows between the ellipses show the existent communication structure of the network. Moreover, the ellipses indicate the identification assigned to the individual nodes, respectively the hop count value given by the existent communication structure. The hop count value 0 is assigned to the central node.

FIG. 1 shows that the transmitting/receiving ranges of K1, K2, K3 and K4 overlap as K2, K3 and K4 are able to communicate directly (arrows), i.e. no intermediate nodes are required for communication. According to the preceding fixed terms, K2, K3 and K4 consequently are each assigned the hop count value=1. K2, K3 and K4 thus also form the first layer about the central node, i.e. the layer defined by the common hop count value=1. Assignment of a certain hop count value to a node and what layer it belongs to depends on the currently selected communication path. If the latter changes, the hop count value, respectively the layer assignment of a node can also change. If, for example, communication between K4 and K1 is not direct but rather via the chain K4-K3-K1 (not depicted), K4 is assigned the hop count value=2, as communication with K1 requires an intermediate node (K3) and the number of required intermediate nodes raised by one therefore is two.

The assignment of the hop count value 2 to nodes K5, K8 and K6 and the hop count value 3 to the nodes K7, and K9 shown in FIG. 1 follows analogously. —Always the same hop count value therefore also determines that nodes K5, K6 and K8 belong to layer 2 and nodes K7 and K9 to layer 3. The individual layers are shown in FIG. 1 as nodes surrounded by a dark area.

Communication between the individual nodes in a multi-hop network is based on wireless data transmission in frames, which are subdivided into defined slots. Preferably two-directional communication methods, used in particular are radio methods employing the following data transmission protocols: time division multiple access (TDMA), frequency division multiple access (FDMA), code division multiple access (CDMA). Subdivision of the frames into the data areas, preferably into a synchronization area, a neighbor node area, and a data area may be useful depending on the application, for example to transmit normal communication data and data for optimizing the network structure simultaneously in one frame. In another advantageous preferred embodiment of the method, by means of parameterization, the frame structure, i.e. the frame duration, the number of slots or subdivision of the frames into areas, the network can be adapted to special conditions during operation.

An element of the invention is that in the method a synchronization signal is transmitted by the central node or by a previously synchronized node, with a slot in the frame of the synchronization signal determined by the transmitting node, the so-called beacon node, being assigned. A beacon slot determined by a transmitting node is fundamentally also retained by the respective node for transmissions of further synchronization signals. Exceptions hereto are described separately in the following.

Furthermore, at least the following data are transmitted with each synchronization signal or as a separately transmitted data packet in connection with a synchronization signal: for all the previously synchronized neighbors of the transmitting node, the beacon slots previously assigned to these neighbors and their neighbors' respective hop count values. In an advantageous further development of the method, in addition, the beacon slots of the previously synchronized direct neighbors of a transmitting node and their hop count values are transmitted as well. In a further development of the method, in addition, the number of successors of the transmitting node in the network are transmitted.

A beacon slot assigned to a node in such a manner and the hop count value have in the network at a certain point in time the function of individual identification, which is distinct for the direct neighbors. Furthermore, collision-free communication between the nodes is made possible in this manner. Additional individual identification of each node in the network is therefore unnecessary but of course possible and even required for certain applications of the method.

The synchronization signals, respectively the data packets connected thereto, are received by all the neighbors of the transmitting node, i.e. both by the previously synchronized neighbors and the not yet synchronized neighbors, and are evaluated respectively. The not yet synchronized neighbors receive with the synchronization signal a time base to which they synchronize. The previously synchronized neighbors of the node use the synchronization signal in an advantageous manner to check their synchronization.

In evaluating the data received by a node, at least the current local neighborhood relationships of the respective node including the already existent communication structure, i.e. in particular the respective beacon slot assignment and the hop count values of its previously synchronized neighbors, are determined and stored. Moreover, in an advantageous manner, the respective beacon slot assignment and the hop count values of its previously synchronized second neighbor are also detected and stored.

As a consequence of the current neighborhood data transmitted with the synchronization signal, a not yet synchronized node recognizes which beacon slots have already been assigned to its neighbors. It detects independently a beacon slot for transmitting its own synchronization signal, which is unassigned at least up to its second neighbor. In this manner each assigned beacon slot is basically protected to the second layer. In a further development of the method, in addition to beacon slot assignment of the direct neighbors, the beacon slot assignment of the second neighbors of the node is also taken into account. Due to the collision-free communication permitted in this manner, the so-called "hidden node" problem is avoided, as will be explained in more detail herein later on.

On the basis of the detected current neighborhood data and/or additional data, such as for example the signal strength of the received synchronization signal, the respective node determines its predecessor in the network on the basis of given criteria. In this manner, a certain communication structure within the multi-hop network is created.

Preferably each node is induced to select that node as its predecessor that:
 a) has the least intermediate nodes in its communication chain to the central node, i.e. which has the lowest hop count value, or
 b) has the least successors, or
 c) whose signals the node receives with the greatest signal strength.

Further criteria can be included in the selection of the predecessor and/or the mentioned criteria as well as additional criteria can be randomly combined. By determining its predecessor, each node selects its communication chain to the central node.

Moreover, with the corresponding selection of its predecessor, the node assigns itself a hop count value one number higher than the hop count value of the selected predecessor.

In normal operation, i.e. after all the nodes have been synchronized and regular data exchange is occurring in the entire network, each node continues to receive its predecessor's synchronization signal to maintain synchronization and transmits its own synchronization signal to reach its successors. The node exchanges data packets with its neighbors. In the background, it is continuously determining its active neighbors and in this manner recognizes changes at least in the local network structure.

If the local neighborhood relations of one node changes for two successive synchronization signals received by it, for example due to the addition of further synchronized neighbor nodes in the network or due to removal or failure of previously synchronized neighbor nodes, the node recognizes this by comparing the currently received neighborhood data with the stored preceding neighborhood data. As a result of the invented method, the network continuously adapts to changes in the network. For example, if the predecessor of a node is removed from the network, the node determines a new predecessor according to the given criteria.

If the method synchronizes a not yet synchronized node, it itself contributes to synchronizing other nodes by transmitting own synchronization signals. After receiving the first synchronization signal, the node can already participate in normal data communication of the previously synchronized multi-hop network. The described process steps are repeated at least until all the nodes in the network are synchronized. Preferably, however, the method is operated parallel to normal communication.

Following the general description of the invented method, the concrete steps at the beginning of the process will now be explained in detail.

At the beginning of synchronization, first only the central node transmits synchronization signals. The other nodes assume a receiving mode (sniff mode). The central node can therefore assign any beacon slot, for example beacon slot 1, before transmitting its first synchronization signal. The hop count value for the central node is, for example, 0. As at the beginning of the synchronization the central node at first does not know any of its neighbors, only its assigned beacon slot=1 and hop count value=0 can be drawn from its synchronization signal. The neighbor nodes of the central node receive the described synchronization signal of the central node, store the transmitted data, respectively evaluate it and synchronize their respective time base to the time base of the central node. Then the previously synchronized nodes for their part transmit their own synchronization signals in a collision-free manner in such a way that the nodes lying further away from the central node can synchronize. The still free beacon slots are assigned, i.e. in the present example the beacon slots 2, 3, 4 etc., and the neighborhood data present at the transmitting node are transmitted. Thus the first node (K1) synchronized to the central node transmits, for example the following data: beacon slot determined by K1=2, the hop count value of K1=1, and the neighborhood data: neighbor with hop count value=0 and beacon slot 1. K1's neighbors receive, evaluate and store these data. In the course of the process the synchronized neighbor nodes of the central node thus form the first synchronized layer about the central node, the second synchronized node lying further away and so on until all the nodes are synchronized. If no beacon slot is free, the node becomes the end node.

Due to the invented method, only a limited number of beacon slots have to be analyzed following reception of a synchronization signal, because after three layers the assigned beacon slots can be used again by other nodes. As a result, the method is very energy efficient and leads to much lower energy consumption than prior art methods. Moreover, the method permits imaging the network, because all the neighbor relationships between the nodes are basically known at one point in time and therefore can also be used to check the communication paths. Moreover, application of the invented method yields the following advantages compared to the state of the art:
 Any size network synchronizes to a central node even in the most difficult propagation conditions.
 All the neighbor nodes are detected with minimum energy.
 Indirect collisions due to hidden nodes are avoided as the information which beacon slots are assigned is conveyed to the neighbors.
 An optimum communication structure is obtained.
 The network automatically adapts to changes, for example due to addition to or removal of nodes from the network or changed radio propagation conditions.

BRIEF DESCRIPTION OF THE DRAWINGS

The present invention is described in the following by way of example without the intention of limiting the scope or spirit of the inventive idea using preferred embodiments with reference to the accompanying drawings.

WAYS TO CARRY OUT THE INVENTION

The first preferred embodiment describes an embodiment of the invented method for synchronization, communication in a distributed multi-hop network, with a central node and a multiplicity of nodes. In this unlimited size multi-hop network, on the one hand the data are transmitted from the node to the central node, on the other hand, the reverse path is also possible. A short duty cycle of approximately 0.02% for transmitting/receiving data can be realized to ensure a long lifetime of the battery-run sensors. Each node detects its neighbors regularly with low energy consumption. The optimum connection to the central node is found during operation and no manual measures are required for installation, respectively for finding failure routes.

The synchronization of the network described in the following is the precondition for many energy-saving data transmission processes.

Figure 1:
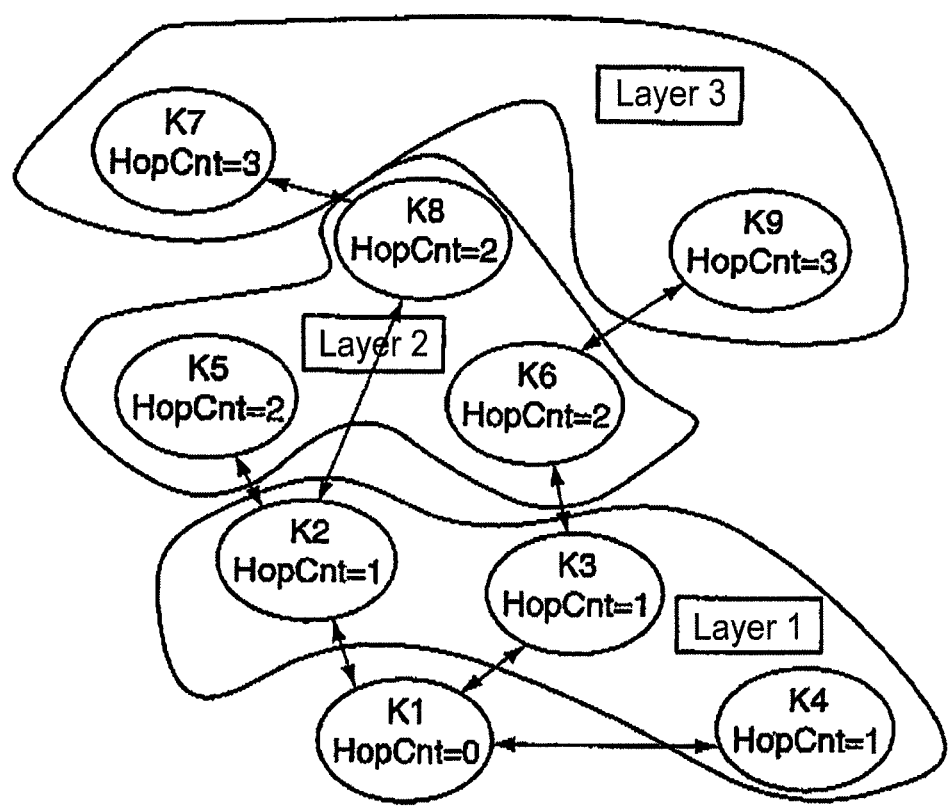
FIG. 1 shows a principle diagram of a multi-hop network.
Figure 2:
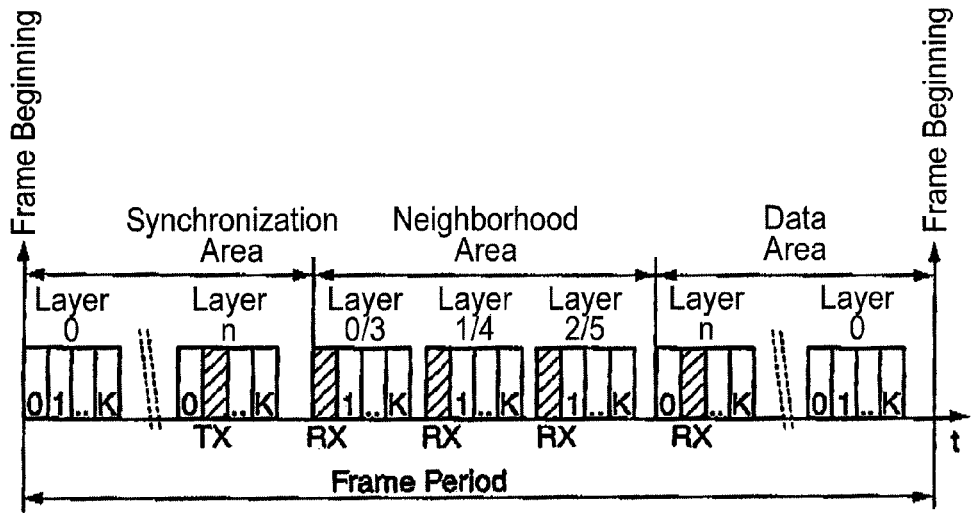
FIG. 2 shows a representation of the frame of a synchronization signal, i.e. of a corresponding time frame with the synchronization area, the neighborhood node area and the data area.

FIG. 2 shows the frame structure preferably selected for the synchronization signal in this preferred embodiment. The frame structure is first defined by a frame time frame with a frame beginning and a frame period (=frame duration). The frame itself is subdivided into a synchronization area, a neighbor node area and a data area. The individual beacon slots are disposed in the synchronization area. The beacon slot assignment of the neighbor nodes is conveyed in the neighbor node area. The actual data communication of the network occurs in the data area.

Each node is identifiable at a certain point in time by means of its hop count value h with $0 \geq h \geq n$ and the beacon slot s with $0 \geq s \geq k$. The beacon slot of the highest hop count value in the example depicted in FIG. 2 is n, the highest beacon slot value is k. The node characterized by h and s transmits its beacon into the beacon slot s and the layer h of the synchronization area. Moreover, in each of the three frame areas, the node is assigned to a slot which is determined by the layer h and the beacon slot s of the respective area. As the layers are sorted in ascending order, the beacon extends into the last layer n of the network in a short time.

In the data area, each node in the layer h and the slot s has a two-directional data slot for communication with its successors. In the beacon, the respective node determines the transmission to successors or predecessors. Optionally, a node can grant an exclusive transmission right to a certain successor. The assignment data of the beacon slots of the neighbor node are transmitted in the neighbor node area. Basically it is set up like the synchronization area with the difference that after three layers, the first layer group is used again. Optionally synchronization data and neighbor node data can be combined to form a packet. In this case, the frame is only subdivided into a synchronization area and a data area. A packet with neighbor node data contains essential information about a node's neighbors, such as:

beacon slots assigned to neighbors,
respective predecessors,
the number of respective successors, and
further local information.

When a node has gathered this information from all the neighbors, it can determine its optimum predecessor and a free beacon slot. In this manner, a collision free network is yielded with balanced ramifications to the central node.

In the preferred embodiment, the nodes alternate transmitting the neighbor node data frame by frame. The assigned beacon slots in the synchronization area determine when which node transmits the neighbor node data.

Each node synchronized to the central node receives its predecessor's beacon, respectively its neighbor's beacon in a certain beacon slot and transmits its own beacon with a synchronization signal. By receiving a beacon in the synchronization signal, a node is synchronized to the frame beginning. Synchronization occurs solely by the beacons in the beacon slot and is thus independent of the data transmission concept.

A multiplicity of data slots are provided in the frame's data area. In theses data slots, the nodes can transmit data packets to their neighbors. The values of the hop count and the beacon slot can be used to structure the data area to reduce collisions. The method for data transmission itself is in the given scope for the most part exchangeable with any other method and familiar to someone skilled in the art.

Optionally, there can be a pause between transmission of the synchronization area and transmission of the neighbor node area and the data area to recharge transmission capacities.

If very many beacon slots have already been assigned, transmitting a synchronization signal can be obviated. The respective node then becomes a so-called end node. In this manner, however, nodes that lie far from a layer can become unreachable.

The synchronization signal contains:

the beacon slot in order that a receiver can determine the frame beginning from the receiving time. A node can change its beacon slot in big time intervals.

the transmitting node's hop count value in order that the neighbors are able to find the optimum route to the central node.

the neighbor's beacon slot to avoid indirect beacon collisions (hidden node problem). The respective beacon slot data can be effectively transmitted as a bitmap.

announcement of an imminent beacon slot change.

After a certain time, all the nodes are synchronized to a common frame beginning. After a frame period, the pattern is repeated.

Figure 3:
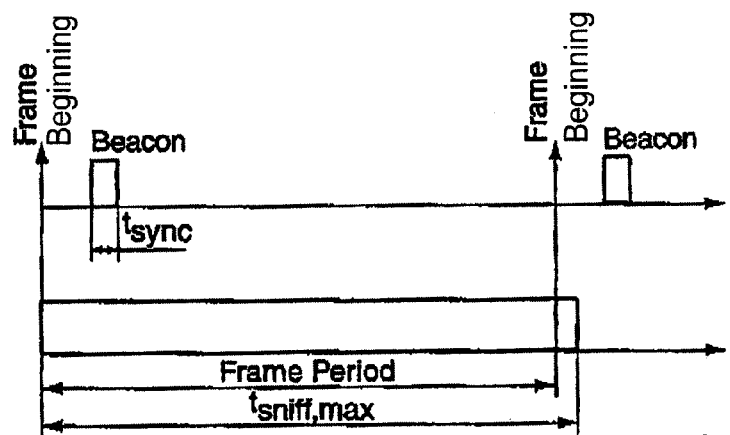
FIG. 3 shows a representation of a time frame to explain a variant of the sniff mode.

The method is based on the principle that each node is itself responsible for synchronizing and for finding the best path to the base. Synchronization and route optimization occurs non-centrally in the nodes. The following principles apply:

To synchronize, an unsynchronized node is first in the so-called sniff mode, i.e. a mode in which it does not transmit but rather tries to receive a synchronization signal with a beacon. For this the following systematic methods are feasible:

FIG. 3 shows a variant of the sniff mode method. FIG. 3 depicts a time frame of a frame which is defined by the frame beginning and the frame period. In the frame, a beacon is transmitted in a $t=t_{sync}$ long beacon slot. The node's reception readiness is then indicated by the black time bar overlapping in the frame period. The node seeks a beacon maximally for the time $t_{sniff,max}=t_{frame}+t_{sync}$ thus for more than one frame period. The black bar represents the time interval of $t_{sniff,max}$.

Figure 4:
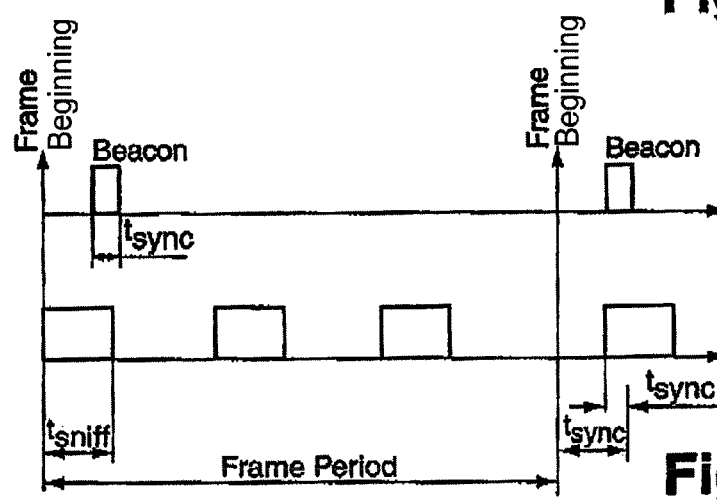
FIG. 4 shows a representation of a time frame to explain another variant of the sniff mode.

FIG. 4 shows another variant of the sniff mode method. Analogous to FIG. 3, FIG. 4 depicts a frame and a beacon transmitted therein in a time interval $t_{sync}$. The node's reception readiness is also represented by the black time bar. If the receiver of the non-sychronized node can only be active for a brief time, in this variant it periodically taps the respective maximum possible receiving duration and then recharges its capacities. The maximum receiving duration is referred to as $t_{sniff}$. After a frame period, it moves its reception window by the difference of Δt out of the reception duration ($t_{sniff}$) and the synchronization time ($t_{sniff}$), $\Delta t=t_{sniff}-t_{sync}$. In this manner, any beacon can be received in the frame after a multiplicity of periods.

As soon as the node receives a beacon, it synchronizes in all methods to the frame beginning. If in a frame period, a multiplicity of neighbors transmit their beacons without collision, the synchronization time shortens, because reception probability has multiplied by the number of neighbors.

Unsuccessful synchronization requires a lot of energy, because the receiver was active for at least one whole frame period without successful termination of the synchronization. In order to retain the preset short duty cycle of, for example, 0.02%, following failure, the next attempt may occur only a few days later. A long lifetime of the battery can only be ensured in this manner.

Figure 5:
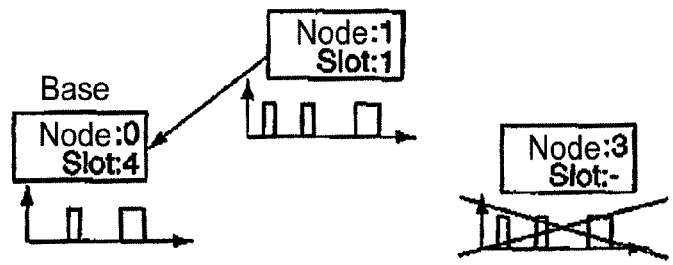
FIG. 5 shows a representation to explain the base link.

FIG. 5 shows that in the present preferred embodiment a node only transmits a synchronization signal if it has received a beacon from its selected predecessor, ensuring thereby both a common time base for the entire network and a passable connection to the central node. In FIG. 5, the node 1 has received a beacon from its selected predecessor. In this manner, node 1 transmits for its part a synchronization signal. Node 3, on the other hand, is not yet synchronized, i.e. it does not transmit an own synchronization signal with a beacon.

In an advantageous preferred embodiment of the method, the beacon of the selected predecessor is received in each frame period.

To avoid collisions, already assigned beacon slots are protected against direct or indirect collisions. For this reason, each node determines before assigning a new beacon slot that it is free for twice the radio range. For the beacon slot selected by the respective node, the node checks the following conditions:
  a) No neighbor is transmitting its beacon on this beacon slot. The node recognizes this by tapping the slot.
  b) No neighbor of a neighbor may use this beacon slot. In other words an assigned beacon slot is protected against double assignment up to the second neighbor. In this manner indirect collision (hidden node problem) is prevented. Each node transmits in its beacon a field in which the beacon slots assigned to its neighbors are marked.
  c) Optional: the beacon slot should be selected randomly from the free beacon slots. As a result of the distribution, less indirect collisions occur during setting up of the network.

In this manner, it is ensured that a beacon slot can be used again after a distance of three nodes (rather: after three hops).

Moreover, in the background each node scans all the beacon slots, respectively the corresponding data signals in the neighborhood area in order to detect new neighbors. Thus it can optimize its route to the central node or it can immediately select another neighbor from its list in the event its selected predecessor fails.

In order to optimize the communication structure, each node selects the predecessor that has the lowest hop count value, the least successors and the greatest received signal strength (received signal strength indication, RSSI value). The hop count value has precedence over the number of successors and the latter has precedence over the received signal strength. If a better neighbor is found, it is selected as the predecessor and its own hop count value is adapted correspondingly.

In an advantageous manner, to avoid collisions each node sporadically changes its beacon slot. Assigned beacon slots are thus protected against direct or indirect collisions (hidden node problem). The node announces the change in the beacon. The successors receive the announcement and try to receive the beacon on the new beacon slot. In this manner, the existent communication paths are retained. Other neighbors only notice that a new beacon slot is being used. If the node's identification does not appear in a new beacon slot, the node has failed or it has been removed from the network.

Figure 6:
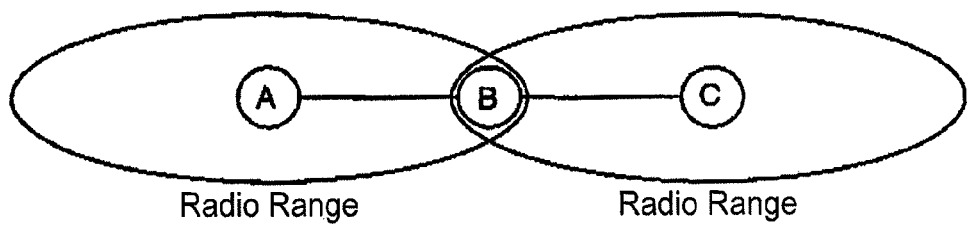
FIG. 6 shows a representation to explain the hidden node problem.

FIG. 6 demonstrates the hidden node problem. Depicted are nodes A, B and C including the radio range of nodes A and C. If node B is located in the middle of two neighbors A and C and A and C transmit in the same beacon slot, the beacons collide at node B without nodes A or C being able to notice. In an extreme case, node B cannot be reached by either C or A.

Changing the beacon slot solves the hidden node problem. Preferably a node retains its beacon slot for at least two synchronization phases as no systematic synchronization of a not yet synchronized node is possible if beacon slot changes occur at shorter intervals. The selection of new beacon slots occurs according to the previously described criteria.

With the hitherto described method, a network is created iteratively continuously optimizing itself until interlinkage is optimum. The following results are achieved:
  avoidance of hidden node collisions,
  finding the shortest (lowest hop count value) and best (predecessor with the highest RSSI value) connection to the central node and
  determination of all the neighbors in the transmitting/receiving range of a node. In this manner, if a node fails, an alternative route can immediately be employed. It is possible to produce a complete image of all the network connections.

Now the setup and optimization of the communication structure within the network will be described in detail, presupposing the following rules:
  each node possesses an identification, the node number,
  all nodes synchronize according to the sequence of their node numbers, and
  selected for beacon transmission is always the free beacon slot with the lowest number.

FIGS. 8a-8g show the corresponding communication structures in a network comprising five nodes with the corresponding node numbers 0 to 5. The nodes are depicted as rectangular boxes in which the node number and the current beacon slot is given. The basically possible radio connections are indicated by thin continuous lines. The actually selected communication connections are shown with thick arrows. The node number of the central node is 0.

Figure 8A:
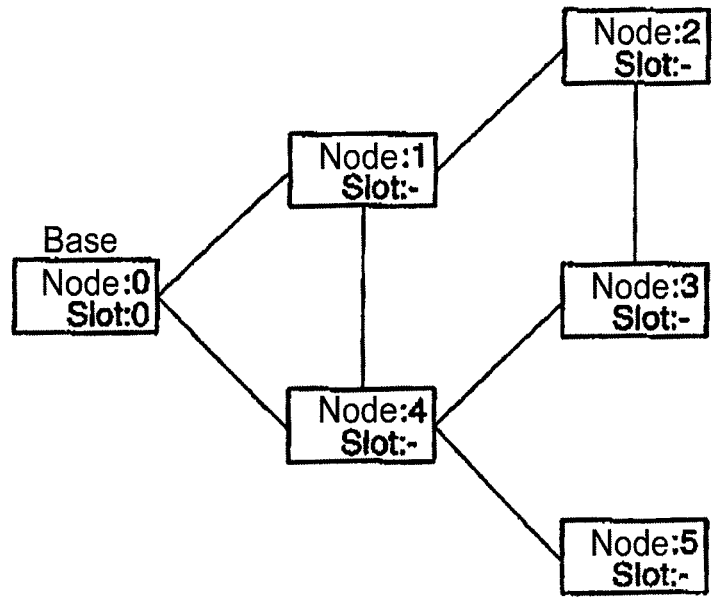
FIG. 8 shows the setup of the communication structure of the network.

FIG. 8a shows as thin connection lines the basically possible communication connections between the individual nodes due to the overlapping transmitting and receiving ranges of the individual nodes. The base node transmits a synchronization signal with a beacon in beacon slot 0. All other nodes are unsynchronized and try to receive a beacon in the sniff mode.

Figure 8B:
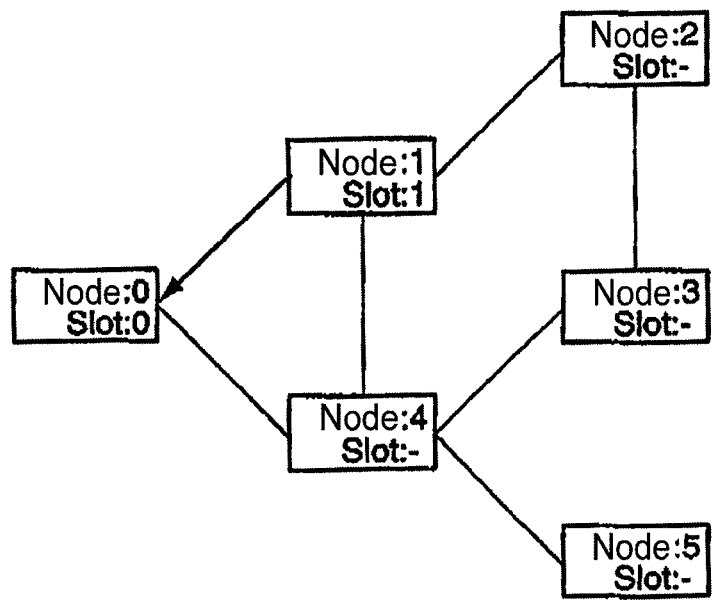

FIG. 8b shows that node 1 has received the beacon of the base node and is synchronized to the frame beginning. The predecessor selected by node 1 is the central node. The hop count value of node 1 is thus 1. As the beacon slot 0 is already assigned to the central node, node 1 transmits its beacon in beacon slot 1.

Figure 8C:
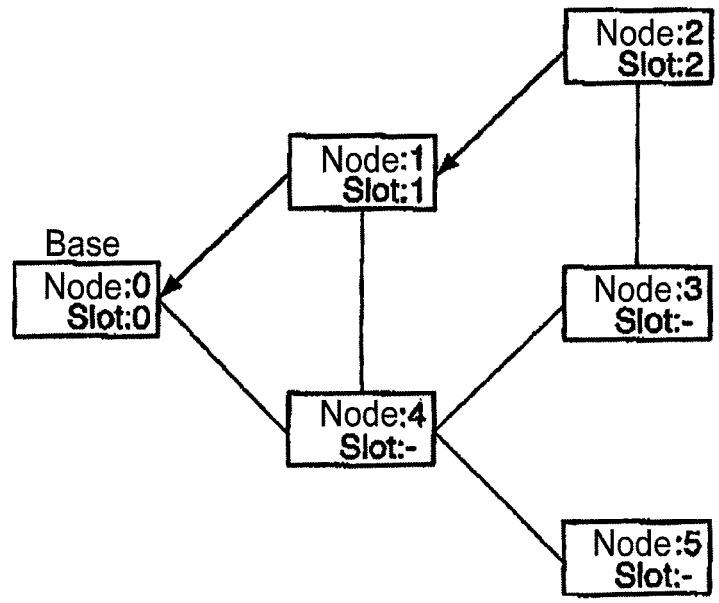

FIG. 8c shows that node 2 is synchronized to the synchronization signal transmitted by node 1 and has selected node 1 as its predecessor. It transmits its beacon in beacon slot 2, as beacon slot 1 is assigned to node 1 and beacon slot 0 is assigned to the neighbor node of node 1.

Figure 8D:
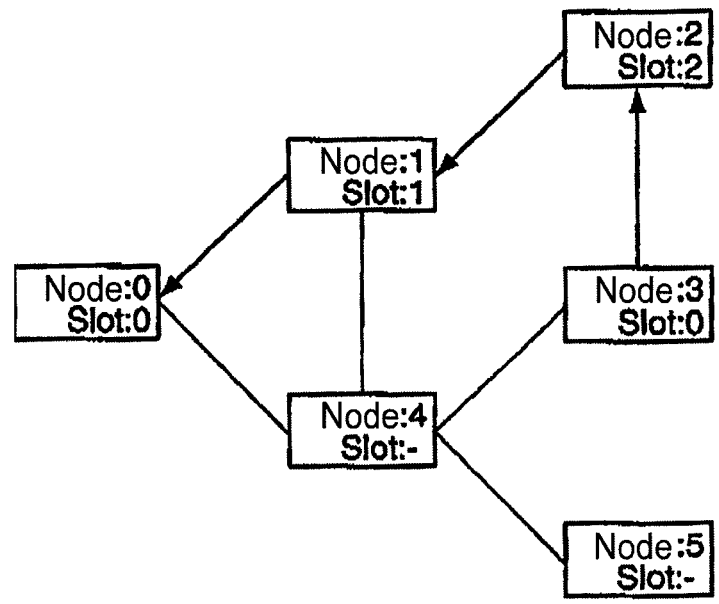

FIG. 8d shows that node 3 is synchronized to 2 and has selected the beacon slot 0 for transmitting its own beacon. This is possible because beacon slot 0 is used by neither its direct neighbor (node 2) nor by its second neighbor. Thus from the point of view of both node 0 and node 3, double use of beacon slot is protected up to the second neighbor. Node 3 is unable to find the optimum path via node 4, as node 4 is not yet synchronized and, therefore, does not transmit a beacon and consequently is still unfamiliar to node 3.

Figure 8E:
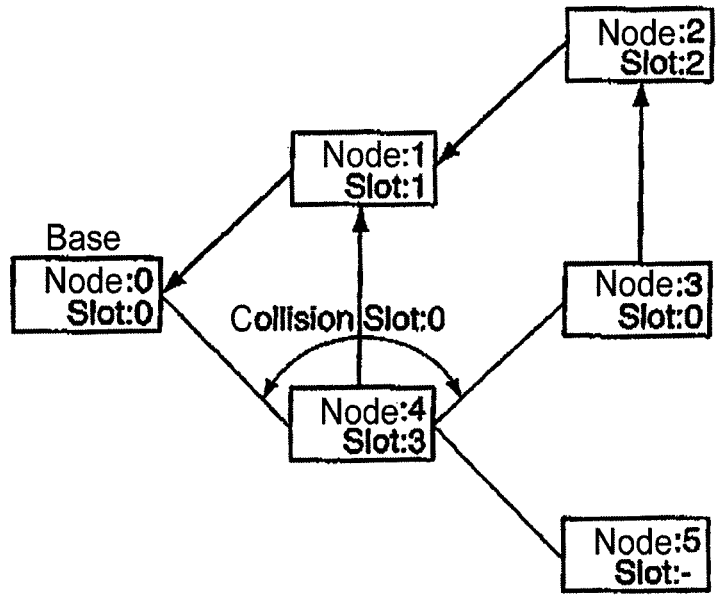

FIG. 8e shows that node 4 receives synchronization signals from both node 0 and node 3 respectively with beacon slot 0, thereby generating collisions in node 4 in such a manner that neither node 0 nor node 3 are visible to node 4 (hidden node problem). The only node visible to node 4 is node 1. Node 4, therefore, synchronizes to node 1 and consequently transmits its beacon in beacon slot 3, as node 4 can draw from node 1's synchronization signal that beacon slot 1 is assigned to node 1 and the beacon slots 1 and 2 are assigned to node 1's neighbors (node 0 and node 2).

Figure 8F:
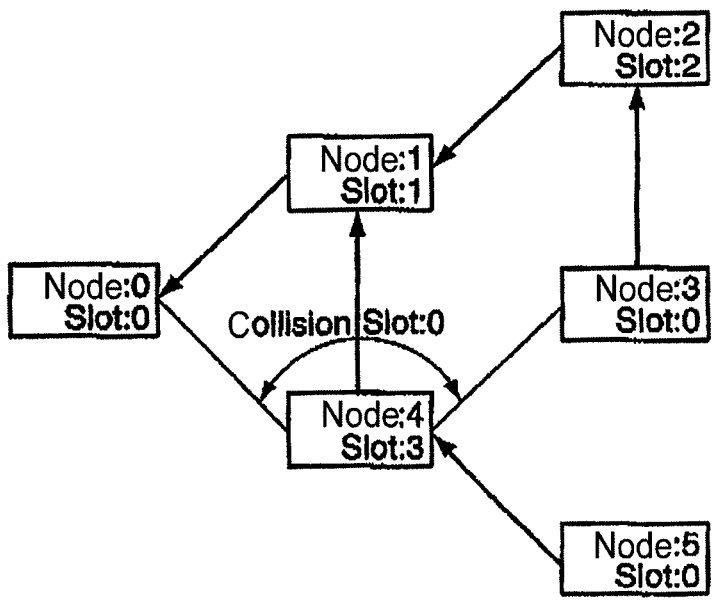

FIG. 8f shows that node 5 is synchronized to node 4 and has selected beacon slot 0 for its own beacon, as the only neighbor visible to node 5 is node 4, and the latter informs node 5 that beacon slot 3 is assigned to it and beacon slot 1 is assigned to its neighbor (node 1). In this phase, all the nodes can be accessed although some only via detours. Further optimization of the communication structure is recommended itself because in node 4 the beacons of node 0 and node 3 collide in the common beacon slot 0. Due to such "hidden node" collisions, nodes may be inaccessible. This problem is solved by sporadically changing the beacon slot, as is shown in FIG. 8g.

Figure 8G:
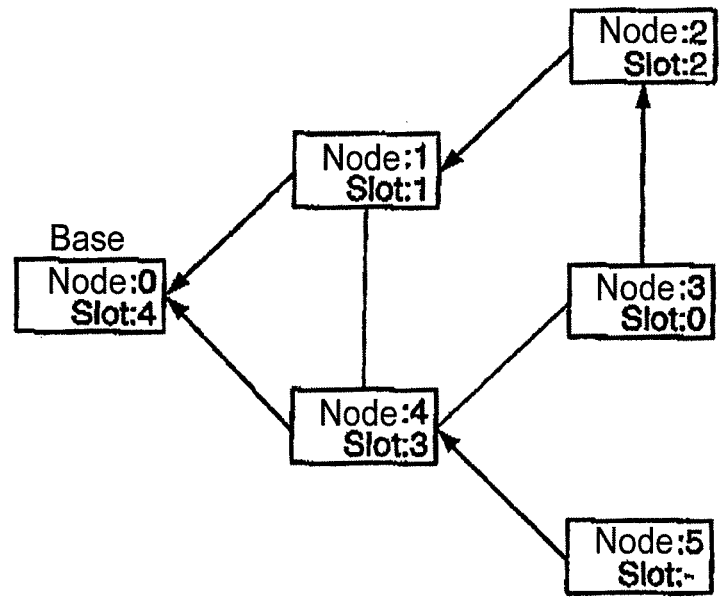

FIG. 8g shows that the central node changes its beacon slot from 0 to 4, which is possible as its neighbors (nodes 1 and 4) and beacon slots 0, 1, 2 and 3 are assigned to its second neighbors (nodes 2 and 5). The collision with respect to beacon slot 0 only affects node 4 up to now so that after changing the central node is now able to receive node 4's beacon any time. The change was announced in the central node's synchronization signal so that node 1 and node 4 tap the beacon slot 4 immediately after the change. Thus, node 4 recognizes the central node. As the central node has a lower hop count value than the previously selected predecessor (node 1), node 4 selects the central node as its predecessor. The connection to node 1 thus becomes a backup connection.

Figure 8H:
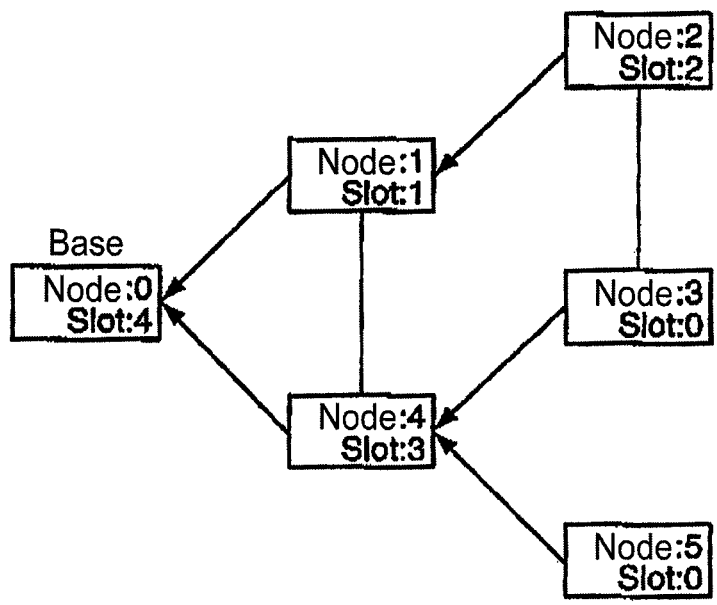

FIG. 8h shows that, due to the lower hop count value, node 3 now selects node 4 as its predecessor. The connection to node 2 becomes a backup connection for node 3. Thus optimum interlinkage to the central node has been found. To be noted is that in the down link, i.e. the communication to the central node, node 3's beacon and node 5's beacon collide in node 4. As the up link, i.e. the communication from the central node to the nodes is collision-free, synchronization functions nonetheless. However, the still existent collision can be remedied as described by sporadically changing the beacon slots assigned to the individual nodes.

The following exceptions can, among other things, occur in the described method:

a) All the nodes of the network are synchronized to the last node B. Node B has two neighbor nodes A and C, which are unable to access each other. Both neighbor nodes transmit their beacon in the same beacon slot. Dampening the respective synchronization signals to the last node is similar on both paths. As a result there is the problem that node B is unable to receive a beacon from either A or C. At most energy detection of the reception signal is possible. Therefore, it does not know the frame beginning and is unable to synchronize. Due to the sporadic change in beacon slot assignment, there is a great probability of eliminating collision.

b) Two neighbor nodes A and B determine a free beacon slot and begin transmission of their beacons in the same frame. If both nodes select the same beacon slot, the two beacons collide. Neither of the nodes recognizes the double assignment. The probability of this scenario is little and can be estimated as follows: P≈duty cycle>*<number of beacon slots>. This collision, too, is eliminated by sporadically changing the beacon slot.

Figure 7:
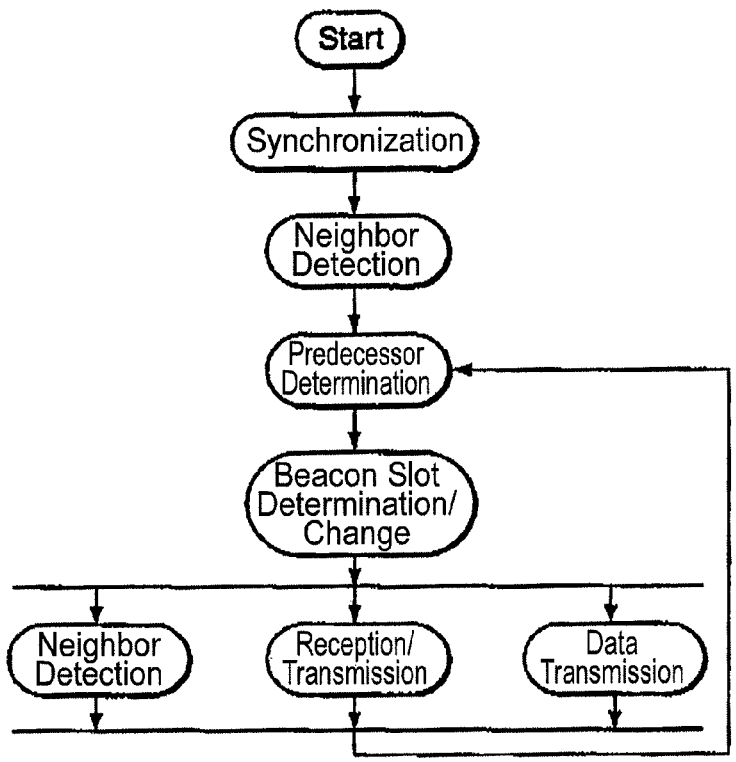
FIG. 7 shows the process course of one node.

From the view point of a single node participating in the network, the method can be explained as shown in FIG. 7. An as yet not synchronized node K1 is assumed, which is surrounded at least by partly synchronized neighbor nodes.

1. Start

A neighbor node begins to transmit a synchronization signal.

2. Synchronization

First K1 tries to receive a synchronization signal from a neighbor in order to synchronize to the beacon of this neighbor.

3. Determination of neighbors

When K1 has received a neighbor's beacon, it recognizes the frame beginning and therefore also the position of the neighbor node area. It taps all the time slots in the neighbor node area. As a result it detects: all the direct neighbors, their distance from the central node (hop count) and how many successors each neighbor already has including all the time slots assigned to the direct and indirect neighbors.

4. Determination of predecessors

K1 determines from the neighborhood data its predecessor according to certain criteria (hop count; received signal strength; number of successors).

5. Determination of the beacon slot

K1 determines from the neighborhood data the assigned time slots and seeks a free time slot to transmit its own beacon according to the preceding rules.

6. Normal operation

In normal operation, K1 receives the beacon of its predecessor in order to retain synchronization and transmits the beacon in its time slot in order to access its successors. It can exchange data packages with a neighbor node in the data area. In the background, it continuously determines its active neighbors and recognizes changes in the network structure in this manner.

7. Changing predecessors

If a predecessor fails or a better predecessor is found, K1 changes to a new predecessor.

8. Changing beacon slots

After a certain time, K1 changes its beacon slot. It informs its successors about this so that they can receive its beacon in the new beacon slot.

9. The process is repeated, normal operation resumes.

The second preferred embodiment also describes an application for the invented method in a multi-hop network with a central node and a multiplicity of sensor nodes. The sensor nodes have, in addition to the previously described hardware infrastructure, one sensor or a multiplicity of sensors with which they are able to determine their environment or detect manipulations on the node itself. In this preferred embodiment, the network is used to monitor infrastructural components in a multi-storied building. A multiplicity of units, for example apartments, are provided on each floor, resulting in allocation of individual sensor nodes to floors and apartments and thus to predetermined clustering of sensor nodes. The aim is to transmit in the network the sensor data gathered by the sensor nodes to the central node. In this preferred embodiment it is assumed that the sensor nodes are permanently installed and each possesses an own identification. The computations described in the following are based on a duty cycle of 0.03% averaged over 12 years. Assumed is 8-10 ms as the maximum continuous transmitting time, and 10-20 ms as the maximum continuous receiving time. The data rate is 100 kbaud.

The method is based on the following principles:
At the beginning of the process, all the sensor nodes are in sniff mode, only the central node transmits synchronization signals, at the beginning of each cycle the central node regularly transmitting its beacon in beacon slot 1.
Each sensor node synchronizes to the beacon that has the lowest hop count number and the highest RSSI value.

A sensor node first synchronizes to the first beacon that it receives in sniff mode and determines its predecessor. In this manner the sensor node is time-synchronous to the already active network and is now able to selectively tap individual beacon slots in each cycle in order to, if need be, find a suited predecessor (beacon). In order for this not to take too long, a time-synchronous sensor node taps a great number of beacon slots in each cycle with approximately 60-ms pauses. After n cycles, the sensor nodes has tapped all the beacon slots and synchronizes to the optimum beacon. Each sensor node that is finally synchronized to a beacon transmits a sync_ind message to the central node for confirmation. Theoretically, this can occur after the sensor node has synchronized to the first beacon.

Each sensor node selects, as described in the preceding, its predecessor and assigns a corresponding hop count value. Each synchronization signal transmitted by a sensor node contains the beacon, the transmitter's identification and corresponding hop count value.

The sync_ind message contains:
the sensor node's identification,
the sensor node's hop count value, and
the RSSI value of the beacon to which the sensor node has synchronized.

After a certain number of cycles, the central node has received all the identifications of the synchronized sensor nodes of a layer. Then the central node selects one sensor node as the repeater node per layer and apartment cluster and assigns each repeater node a different beacon slot greater than 1.

In an alternative preferred embodiment, the central node first selects the repeater nodes which however do not begin transmitting their beacons almost simultaneously until after a subsequent broadcast command.

In this manner, for example, 100 repeater nodes are created in a ten-story building with ten apartments on each floor. It may be a few less or more if an apartment is only partly detected by a beacon from the lower layer. In this case, it is advantageous to provide an additional repeater node in that part of the apartment that then belongs to the next higher layer.

The decision which sensor node per cluster (apartment) is selected as a repeater node and in which beacon slot it transmits can be made according to the following parameters:
RSSI value (e.g. average value)
floor (beacon slot assignment, to avoid collisions, e.g. in the case of "hidden node").

Each repeater node transmits its beacon regularly in the beacon slot assigned to it. The remaining sensor nodes not selected as a repeater node communicate with the central node via a beacon node of the next lower sphere.

As an advantageous alternative, the remaining sensor nodes of an apartment cluster, i.e. all the sensor nodes of an apartment not selected as repeater nodes, synchronize to the repeater node with their apartment identification. This has the energy advantage that the communication link within an apartment is better than over a floor. The data transmission of the sensor nodes occurs via their respective repeater and the repeater nodes' path determined in the synchronization, into the individual layers.

Step-by-step synchronization yields automatic repeater paths into the top floors. Just these repeater paths allow relatively fast realization of a command transmission into the top floors. The commands can be transmitted in various ways:
the command is transmitted in the beacon, i.e. in the beacon slot;
after the beacon frame, follows a frame command;
or as a regular data packet.

Figure 9:
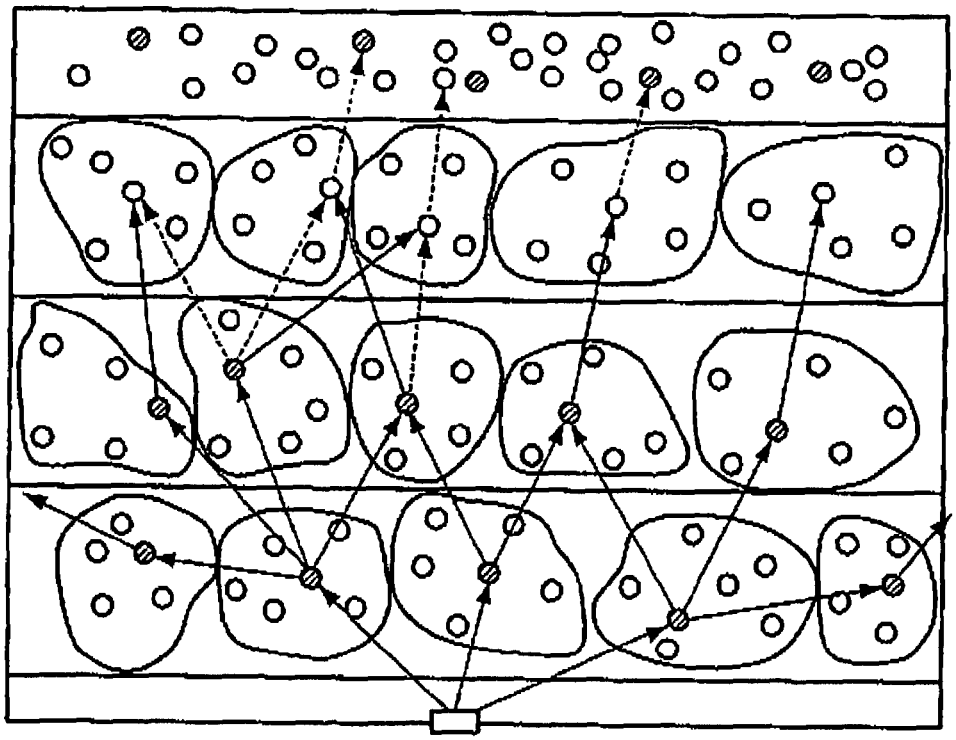
FIG. 9 shows the communication structure between a central node and a multiplicity of sensor nodes via so-called repeater nodes.

FIG. 9 shows schematically the distribution of sensor nodes in a four-story building. The individual sensor nodes (white circles) are assigned to individual apartment clusters on the floors. In each cluster, one sensor node is selected as the repeater node. Between the repeater nodes is a communication structure (black arrow), which permits communication between the repeater nodes and the central node on the ground floor of the building. The individual sensor nodes always select the repeater node in their respective apartment cluster for communication with the central node, for example as predecessor.

Figure 10:
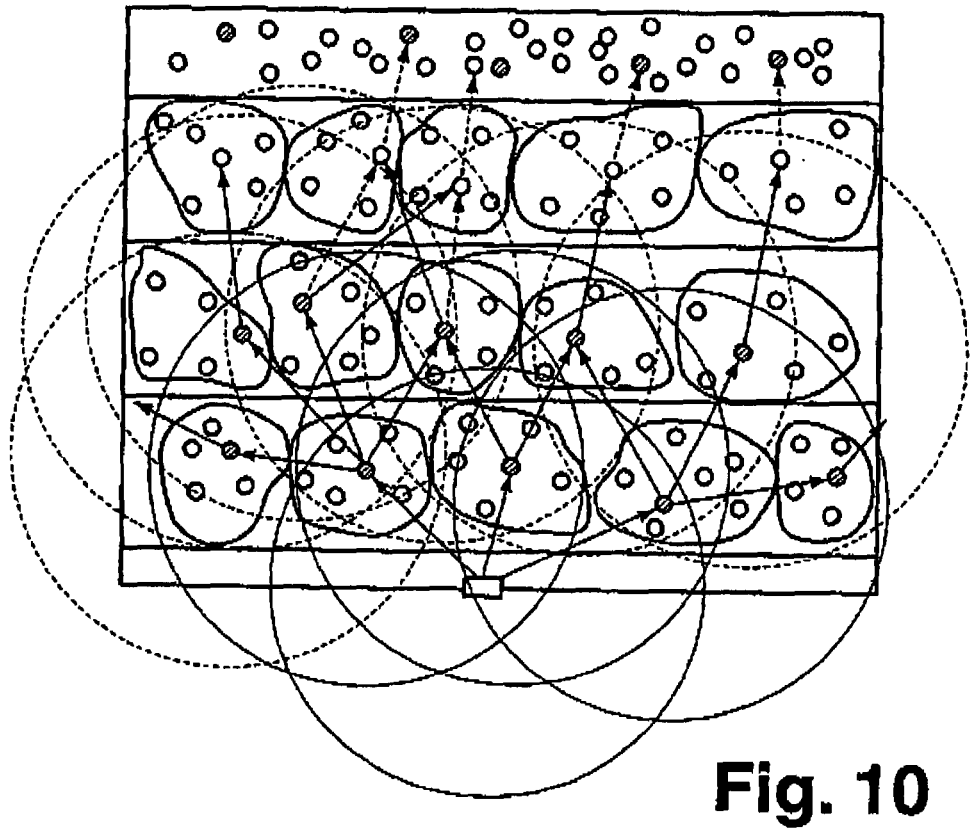
FIG. 10 shows the communication structure as in FIG. 9 with the representation of the transmitting/receiving ranges of individual nodes.

FIG. 10 differs from FIG. 9 in that the transmitting and receiving ranges of the individual repeater nodes are depicted with circles.

Each sensor node in the transmitting range of the central nodes receives the beacon of the central node (hop count 0), is synchronized to it and responds to the master with a sync_ind message in a data slot. The beacon can be maximally 8-10 ms long. With a data rate of 100 kbaud and Manchester coding, this corresponds to approximately 50-62 bytes at disposal for a beacon. Theoretically, reassigning the beacon slot from the start after a few hops, respectively layers, can be obviated, but rather an own beacon slot can be provided for each repeater node. In the present example, depending on the number of repeaters, 100-200 would yield a 1-2 seconds long beacon frame. This method would be especially useful in the following alternative case.

An alternative would be if each individual beacon slot would be 60-70 ms long and the beacon slots would be assigned in ascending order. In other words, each predecessor transmits a repeater node in a lower beacon slot. Each repeater node can then receive the beacon of its predecessor repeater node in a beacon slot and transmit its own beacon in the next beacon slot. In this manner, commands can be very quickly transmitted up, yielded however, depending on the number of repeaters and the exact slot length, would be a very long beacon frame of approximately 6-14 seconds.

In this case, the yielded long beacon slot times are due to that it is theoretically possible that a beacon is received in one slot and directly transmitted on in the next slot. After receiving the beacon however, the rechargeable battery needs 50-60 ms to recharge. It can be ensured that always at least 5 slots lie between the slot sequence so that it is possible to work with 10 ms long slots.

Data transmission in the network is preferably based on a contention-based process.

In conclusion, the infinitely variable synchronization of a two-directional wireless readout network, which then is maintained synchronous, is described in the second preferred embodiment. During installation in the apartment, each sensor node receives a distinct identification containing the apartment number and the corresponding floor by means of a special syntax, permitting logical clustering according to apartments. Denoting the beacon-repeater nodes within a logical cluster (apartment) automatically yields a hierarchical organization of the system, determining the routing paths for communication. Moreover, it is feasible that the beacon-repeater nodes are organized in a higher ranking network. To optimize power consumption, the repeater task should be periodically transferred to neighbor nodes.

What is claimed is:

1. A method for synchronization and communication in a multi-hop network having a multiplicity of nodes and a central node, each of which having at least one transmitting/receiving unit, a storage unit and a processor unit, with communication between the transmitting/receiving units being based on wireless data transmission in frames, which are subdivided into defined slots, the nodes and the central node being spatially positioned in relation to each other in such a manner that at least one further node and/or the central node is located in the transmitting/receiving range of each node as its neighbor, communication between a node and the central node, if the node is located outside the central node's transmitting/receiving range, occurring through a utilization of further nodes as intermediate nodes via a multi-hop communication, and each node being assigned a hop count value giving the number of intermediate nodes raised by one for the respective node via which communication with the central node occurs, with the nearest intermediate node of the respective node in the network during communication with the central node being referred to as the node's predecessor, the node being a successor of the intermediate node, and all the nodes with the same hop count values being referred to as a layer, comprising the following process steps:

a) transmitting a synchronization signal by a transmitting node to a first node, the synchronization signal comprising a beacon located in a beacon slot and at least the hop count value of the transmitting node, the beacon slot and hop count value being transmitted in the frame of the synchronization signal, the transmitting node being a central node or a previously synchronized node, the beacon slot being selected by the transmitting node, and the beacon being a data packet that enables synchronization of at least the first node, wherein the respective beacon slots and the hop count values are transmitted in the frame of the synchronization signal or as a separate data signal by the transmitting node for all the previously synchronized neighbor nodes of the transmitting node known to the transmitting node, wherein each node determines before assigning a new beacon slot that the beacon slot is free for twice the radio range, the beacon slot being selected randomly by the respective node, and wherein the node checks to determine that: (1) no neighbor is transmitting its beacon on said beacon slot by tapping the slot; and (2) no neighbor of a neighbor is using said beacon slot;

b) receiving the synchronization signal and the data transmitted in connection therewith by the first node lying in the transmitting/receiving range of the transmitting node, c) synchronizing the first node to the synchronization signal, d) detecting, by the first node, neighbors of the first node and the respective beacon slot assignment and hop count value of each neighbor, e) determining the predecessor of the first node in the network by the first node on the basis of a given criteria, f) storing, by the first node, the data received with the synchronization signal as well as data received in connection therewith and determined therefrom, and g) repeating steps a) to f) at least until synchronization of all the nodes.

2. The method according to claim 1, wherein transmission of the synchronization signal by the central node occurs recurrently.

3. The method according to claim 1, wherein the steps a) to g) are executed recurrently even after complete synchronization of all the nodes.

4. The method according to claim 1, wherein the frame of the synchronization signal or the separate data signal includes the beacon slot assignment and hop count value of the central node.

5. The method according to claim 1, wherein determination of the predecessor of the first node is based on selecting the neighbor with the lowest hop count value.

6. The method according to claim 1, wherein determination of the predecessor of the first node is based on selecting the neighbor with the least successors.

7. The method according to claim 1, wherein data of the second neighbors of the first node is utilized for determination of the predecessor of the first node.

8. The method according to claim 1, wherein determination of the predecessor of the first node is based on selecting the neighbor whose synchronization signal is received by the first node with the greatest signal strength.

9. The method according to claim 1, wherein in transmitting the synchronization signal, the transmitting node selects its beacon slot in the frame in such a manner that a beacon slot is selected which is unassigned up to its second neighbors.

10. The method according to claim 1, wherein a node which cannot find a free beacon slot becomes an end node which does not transmit a synchronization signal.

11. The method according to claim 1, wherein for each layer, a number of beacon slots is reserved in the frame of the synchronization signal.

12. The method according to claim 1, wherein at least as many beacon slots are provided in the frame of the synchronization signal as there is overlapping of transmitting/receiving ranges of the individual transmitting/receiving units.

13. The method according to claim 1, wherein a node only transmits an own synchronization signal after having received a synchronization signal from its predecessor.

14. The method according to claim 1,
wherein each node transmitting a synchronization signal uses its selected beacon slot at least for a limited period in each further transmission of a synchronization signal.

15. The method according to claim 1,
wherein the central node or a node transmits a synchronization signal which has a changed beacon slot in the frame with regard to the synchronization signal previously transmitted by the central node or by the respective node.

16. The method according to claim 15,
wherein an imminent change of the beacon slot is transmitted by the node as data information to the respective neighbors before the node executes the change.

17. The method according to claim 1,
wherein before transmission of a synchronization signal by a node, the node selects a beacon slot which differs from the beacons slots used by its neighbors.

18. The method according to claim 1,
wherein before transmission of the synchronization signal by a node, the node selects a beacon slot which differs from the beacons slots used by its neighbors and its second neighbors.

19. The method according to claim 1,
wherein each node evaluates in particular its selected predecessor's synchronization signals and data connected therewith and compares the synchronization signals and data with the stored data of the preceding received synchronization signal and if there are deviations, renewed determination of the predecessor according to the process step e) occurs.

20. The method according to claim 1,
wherein TDMA (time division multiple access), FDMA (frequency division multiple access), or CDMA (code division multiple access) protocols are used for data transmission.

21. The method according to claim 1,
wherein each node and the central node possess an own identification which is always transmitted with the synchronization signal.

22. The method according to claim 21,
wherein after its synchronization, a node transmits to the central node a sync-signal which includes at least its identification.

23. The method according to claim 1,
wherein the frames have a frame structure which has at least one synchronization area in which beacon slots are transmitted, and at least one data area in which data are transmitted.

24. The method according to claim 23,
wherein for each node, an individual slot, which is determined by its hop count value and its selected beacon slot, is provided in the synchronization area and in the data area.

* * * * *